US008834641B2

(12) United States Patent
Baker et al.

(10) Patent No.: US 8,834,641 B2
(45) Date of Patent: Sep. 16, 2014

(54) METHOD OF USE FOR DEBRIS REMOVAL SYSTEM FOR POWER TOOL

(71) Applicant: Credo Technology Corporation, Broadview, IL (US)

(72) Inventors: Timothy Baker, Roselle, IL (US); Josh Barhitte, Heber, CA (US); Barry Jacobs, Cranford, NJ (US); Harald Krondorfer, Aurora, OH (US)

(73) Assignee: Credo Technology Corporation, Broadview, IL (US)

( * ) Notice: Subject to any disclaimer, the term of this patent is extended or adjusted under 35 U.S.C. 154(b) by 0 days.

(21) Appl. No.: 13/836,177

(22) Filed: Mar. 15, 2013

(65) Prior Publication Data
US 2013/0199574 A1   Aug. 8, 2013

Related U.S. Application Data

(62) Division of application No. 12/633,582, filed on Dec. 8, 2009, now Pat. No. 8,397,342.

(60) Provisional application No. 61/121,076, filed on Dec. 9, 2008.

(51) Int. Cl.
| | |
|---|---|
| *B08B 15/04* | (2006.01) |
| *B08B 5/04* | (2006.01) |
| *B08B 5/00* | (2006.01) |
| *A47L 5/00* | (2006.01) |
| *B25F 5/02* | (2006.01) |
| *B23Q 11/00* | (2006.01) |

(52) U.S. Cl.
CPC . *B25F 5/02* (2013.01); *B08B 15/04* (2013.01); *B08B 5/00* (2013.01); *B23Q 11/0042* (2013.01); *B23Q 11/0071* (2013.01); *B23Q 11/0046* (2013.01); *B08B 5/04* (2013.01)
USPC .......... 134/21; 15/300.1; 15/301; 15/328; 15/329; 408/67

(58) Field of Classification Search
CPC .......... B23Q 11/0042; B23Q 11/0046; B23Q 11/0071; B08B 5/04; B08B 5/00; B08B 15/04
USPC ................. 134/21; 15/300.1, 301, 328, 329; 408/67
See application file for complete search history.

(56) References Cited

U.S. PATENT DOCUMENTS

| | | | |
|---|---|---|---|
| 2,246,916 | A | 6/1941 | Fischer |
| 2,339,324 | A | 1/1944 | Fischer |

(Continued)

FOREIGN PATENT DOCUMENTS

| | | |
|---|---|---|
| DE | 37 34 127 A1 | 4/1989 |
| JP | 03-035914 A | 2/1991 |

(Continued)

OTHER PUBLICATIONS

Bosch, 7/8" SDS-plus® Rotary Hammer/ Model: 11221DVS, printed on Mar. 10, 2010, 2 pages.

(Continued)

*Primary Examiner* — Alexander Markoff
(74) *Attorney, Agent, or Firm* — Foley & Lardner LLP

(57) ABSTRACT

A method of using a hand-held power tool having a debris removal attachment is provided. The method includes providing a hand-held power tool having an output shaft and selectively coupling an extension shaft to the output shaft. The method also includes coupling a first impeller to the extension shaft and providing a housing adjacent the first impeller. The method further includes rotating the first impeller to generate a pressure differential sufficient to draw debris into the housing. The extension shaft has a first end and a second end, the first end configured to couple to the output shaft of the hand-held power tool, and the second end configured to couple to a tool bit.

20 Claims, 11 Drawing Sheets

(56) References Cited

U.S. PATENT DOCUMENTS

| | | | | |
|---|---|---|---|---|
| 3,022,806 | A | 2/1962 | Johnston | |
| 3,263,909 | A * | 8/1966 | Mazepa | 415/199.3 |
| 3,850,254 | A * | 11/1974 | Hirdes | 173/75 |
| 4,409,699 | A | 10/1983 | Moorhouse | |
| 4,652,184 | A | 3/1987 | Fischer | |
| 4,675,999 | A | 6/1987 | Ito et al. | |
| 4,742,855 | A | 5/1988 | Hartley | |
| 4,750,536 | A | 6/1988 | Grisley | |
| 4,765,099 | A * | 8/1988 | Tanner | 451/359 |
| 4,821,365 | A | 4/1989 | Charters | |
| 4,921,375 | A | 5/1990 | Famulari | |
| 5,031,494 | A | 7/1991 | Asselborn et al. | |
| 5,033,917 | A | 7/1991 | McGlasson et al. | |
| 5,084,972 | A | 2/1992 | Waugh | |
| 5,090,499 | A * | 2/1992 | Cuneo | 175/209 |
| 5,176,478 | A | 1/1993 | Munch | |
| 5,199,501 | A * | 4/1993 | Kluber et al. | 173/75 |
| 5,311,914 | A | 5/1994 | Stornetta | |
| 5,349,752 | A | 9/1994 | Stirm | |
| 5,370,165 | A | 12/1994 | Stornetta | |
| 5,383,275 | A | 1/1995 | Hild et al. | |
| 5,463,816 | A | 11/1995 | Bellew et al. | |
| 5,474,116 | A | 12/1995 | Shoda | |
| 5,503,203 | A | 4/1996 | Stornetta | |
| 5,509,454 | A | 4/1996 | Giacometti | |
| 5,584,620 | A | 12/1996 | Blickhan et al. | |
| 5,630,682 | A | 5/1997 | Davey | |
| 5,632,578 | A | 5/1997 | McCurry et al. | |
| 5,662,440 | A | 9/1997 | Kikuchi et al. | |
| 5,713,785 | A | 2/1998 | Nishio | |
| 5,772,367 | A * | 6/1998 | Daniel | 408/67 |
| 5,815,934 | A | 10/1998 | Eichberger et al. | |
| 5,845,688 | A | 12/1998 | Qian | |
| 5,856,715 | A | 1/1999 | Peot et al. | |
| 5,904,453 | A * | 5/1999 | Gavia | 408/67 |
| 5,947,661 | A | 9/1999 | Sugata | |
| 5,984,598 | A | 11/1999 | Arai et al. | |
| 6,007,415 | A | 12/1999 | Van Osenbruggen | |
| 6,024,144 | A | 2/2000 | Qian | |
| 6,079,078 | A | 6/2000 | Byington | |
| 6,122,799 | A * | 9/2000 | Shimizu et al. | 15/412 |
| 6,146,066 | A | 11/2000 | Yelton | |
| 6,161,993 | A | 12/2000 | Campian | |
| 6,183,527 | B1 | 2/2001 | O'Banion et al. | |
| 6,237,657 | B1 | 5/2001 | Qian | |
| RE37,247 | E | 6/2001 | Blickhan et al. | |
| 6,312,325 | B1 | 11/2001 | Van Osenbruggen | |
| 6,368,199 | B1 | 4/2002 | Van Osenbruggen | |
| 6,394,940 | B1 | 5/2002 | Sugata et al. | |
| 6,454,640 | B1 | 9/2002 | Siedler et al. | |
| 6,502,949 | B1 | 1/2003 | Horiyama et al. | |
| 6,557,261 | B1 | 5/2003 | Buser et al. | |
| 6,569,002 | B2 | 5/2003 | Smith et al. | |
| 6,601,621 | B2 | 8/2003 | Wixey et al. | |
| 6,629,548 | B1 | 10/2003 | Chiang | |
| 6,640,854 | B2 | 11/2003 | Kalmbach et al. | |
| 6,708,744 | B2 | 3/2004 | Wixey et al. | |
| 6,808,341 | B2 | 10/2004 | Lai et al. | |
| 6,830,113 | B2 | 12/2004 | Moore et al. | |
| 6,848,985 | B2 | 2/2005 | Lamprecht et al. | |
| 6,851,898 | B2 * | 2/2005 | Ege et al. | 408/67 |
| 6,854,937 | B1 | 2/2005 | Weiss | |
| 6,935,939 | B1 | 8/2005 | Buser et al. | |
| 6,991,664 | B2 | 1/2006 | Riehmann et al. | |
| 7,182,150 | B2 | 2/2007 | Grossman | |
| 7,235,006 | B2 | 6/2007 | Ikeda et al. | |
| 7,296,323 | B2 | 11/2007 | Hayama et al. | |
| 7,318,768 | B2 | 1/2008 | Deshpande et al. | |
| 7,369,916 | B2 | 5/2008 | Etter et al. | |
| 7,497,886 | B2 | 3/2009 | Walker | |
| 7,509,900 | B2 | 3/2009 | Young | |
| 7,574,950 | B2 | 8/2009 | Hetcher et al. | |
| 2002/0009951 | A1 | 1/2002 | Smith et al. | |
| 2002/0112582 | A1 | 8/2002 | Young | |
| 2002/0134465 | A1 | 9/2002 | Liao et al. | |
| 2002/0174912 | A1 | 11/2002 | Wixey et al. | |
| 2002/0178588 | A1 | 12/2002 | Okumura et al. | |
| 2002/0182023 | A1 | 12/2002 | Lai et al. | |
| 2003/0106613 | A1 | 6/2003 | Kalmbach et al. | |
| 2003/0206779 | A1 | 11/2003 | Kopras et al. | |
| 2004/0020671 | A1 | 2/2004 | Lamprecht et al. | |
| 2004/0060145 | A1 | 4/2004 | Hayama et al. | |
| 2004/0076485 | A1 | 4/2004 | Kraus | |
| 2004/0094114 | A1 | 5/2004 | Riehmann et al. | |
| 2004/0240956 | A1 | 12/2004 | Bernardi et al. | |
| 2004/0251041 | A1 | 12/2004 | Grossman | |
| 2005/0089380 | A1 | 4/2005 | Stoerig | |
| 2005/0245182 | A1 | 11/2005 | Deshpande et al. | |
| 2005/0245183 | A1 | 11/2005 | Deshpande et al. | |
| 2005/0247177 | A1 | 11/2005 | Hetcher et al. | |
| 2005/0247178 | A1 | 11/2005 | Hetcher et al. | |
| 2005/0262978 | A1 | 12/2005 | Hetcher et al. | |
| 2005/0262983 | A1 | 12/2005 | Hetcher et al. | |
| 2005/0262984 | A1 | 12/2005 | Hetcher et al. | |
| 2005/0268427 | A1 | 12/2005 | Britz | |
| 2005/0279213 | A1 | 12/2005 | Otto | |
| 2005/0280228 | A1 | 12/2005 | Fernandes et al. | |
| 2006/0103090 | A1 | 5/2006 | Fernandes et al. | |
| 2006/0104731 | A1 | 5/2006 | Etter et al. | |
| 2006/0107633 | A1 | 5/2006 | Walker | |
| 2006/0162523 | A1 | 7/2006 | Hetcher et al. | |
| 2006/0178087 | A1 | 8/2006 | Wuensch et al. | |
| 2006/0186102 | A1 | 8/2006 | Inagaki et al. | |
| 2006/0211351 | A1 | 9/2006 | Ikeda et al. | |
| 2006/0266184 | A1 | 11/2006 | Hetcher et al. | |
| 2006/0276116 | A1 | 12/2006 | Reich et al. | |
| 2007/0182114 | A1 | 8/2007 | Fernandes et al. | |
| 2007/0207703 | A1 | 9/2007 | Deshpande et al. | |
| 2007/0251199 | A1 | 11/2007 | Valentini | |
| 2007/0287365 | A1 | 12/2007 | Deshpande et al. | |
| 2007/0292222 | A1 * | 12/2007 | Colon | 408/1 R |
| 2008/0020686 | A1 | 1/2008 | Reich et al. | |
| 2008/0227373 | A1 | 9/2008 | Zhang et al. | |
| 2008/0318500 | A1 | 12/2008 | Fukinuki et al. | |
| 2009/0021090 | A1 | 1/2009 | Du et al. | |
| 2009/0032138 | A1 | 2/2009 | Alleman et al. | |
| 2009/0100682 | A1 | 4/2009 | Delfini et al. | |
| 2009/0246013 | A1 * | 10/2009 | Kenyon et al. | 415/208.2 |
| 2009/0275273 | A1 | 11/2009 | Purohit et al. | |

FOREIGN PATENT DOCUMENTS

| | | |
|---|---|---|
| JP | 03-079314 A | 4/1991 |
| JP | 05-277886 A | 10/1993 |
| JP | 06-155223 A | 6/1994 |
| JP | 06-170683 A | 6/1994 |
| WO | WO-2007/134405 | 11/2007 |

OTHER PUBLICATIONS

Bosch, 7/8" SDS-plus® Rotary Hammer/ Model: 11221DVS, printed on Mar. 22, 2010, 2 pages.

Bosch, Industrial, 7/8" Rotary Hammer for 11221DVS, Model 0611221539, Jan. 1998, 2 pages, Chicago, Illinois.

Bosch, Operating/Safety Instructions for 11221DVS, printed on Feb. 11, 2003, 27 pages.

* cited by examiner

METHOD OF USE FOR DEBRIS REMOVAL SYSTEM FOR POWER TOOL

CROSS-REFERENCE TO RELATED PATENT APPLICATIONS

This application is a Divisional of U.S. patent application Ser. No. 12/633,582, filed Dec. 8, 2009, which claims priority to and the benefit of U.S. Provisional Patent Application No. 61/121,076, filed Dec. 9, 2008, both of which are incorporated herein by reference in their entireties.

BACKGROUND

The present disclosure relates generally to the field of hand-held power tools. More specifically, the present disclosure relates to hand-held power tools that include systems for collecting or otherwise removing debris (e.g., particles, dust, sawdust, chips, etc.) generated during operation of the hand-held power tools.

Hand-held power tools, such as rotary cutout or cutting tools, generally include a housing and an electric motor contained within or at least partially enclosed by the housing. The motor is configured to move a tool bit or other cutting accessory at high speeds to form cuts in a workpiece (e.g., a piece of wood, drywall, tile, etc.). For example, a rotary cutting tool such as that disclosed in U.S. Pat. Nos. 5,813,805 and 6,443,675 to Kopras et al. (the disclosures of which are incorporated by reference herein in their entirety) is configured to rotate a helical or spiral cutting tool bit that includes a sharp cutting edge wrapped in a helix around the longitudinal axis of the bit. According to this example, the rotary cutting tool forms cuts in a workpiece by moving the tool in a direction that is substantially perpendicular to the axis of rotation of the tool bit (i.e., the rotary cutting tool is arranged substantially normal to the workpiece surface and moved parallel to the surface of the workpiece to allow the edges of the tool bit to remove material from the workpiece).

Hand-held power tools are known to generate a substantial amount of debris while cutting. Such debris may interfere with further cutting by accumulating on the workpiece, on the tool bit, and/or within the cutting tool itself. Such debris may also become airborne and be dispersed throughout the working environment. This may be particularly undesirable if the hand-held power tool is being used in a "clean" environment, such as within a finished room (e.g., decorated, furnished, carpeted, etc.) since additional cleanup may be necessary.

Some power tools employ vacuum systems connected to the tool to remove cutting debris. Such vacuum systems typically make use of an adapter that has to be connected to an external or standalone vacuum system (e.g., a shop vacuum, etc.) via a vacuum hose or conduit. Thus, use of such an adapter requires a user to obtain a standalone vacuum system. Further, requiring a hand-held power tool to be coupled to a standalone vacuum system often makes use of the hand-held power tool more cumbersome. For example, the vacuum conduit coupling the adapter to the standalone vacuum system may interfere with the mobility or range of use of the tool. Further, the vacuum conduit may disrupt the balance or feel of the tool for a user.

Some power tools employ vacuum systems which are integrally formed with the power tool. Such vacuum systems may increase the overall size and weight of the power tools. As can be appreciated, a user is likely to use a hand-held power tool for both applications in which a vacuum system would be desirable and applications in which a vacuum system would be unnecessary.

Thus, there is a need for a power tool having a debris removal system that is not required to be connected to a standalone vacuum system. There is also a need for a power tool having a detachable debris removal system that may be securely coupled to the power tool in a relatively simple and efficient manner. There is also a need to provide a power tool that includes a debris removal system configured to reduce the amount of debris entering the motor housing of the power tool. There is also a need for a power tool that includes a debris removal system that is driven by an already existing output shaft of the power tool.

It would be desirable to provide a power tool and/or a debris removal attachment that provides one or more of these or other advantageous features as may be apparent to those reviewing this disclosure. The teachings disclosed extend to those embodiments which fall within the scope of the appended claims, regardless of whether they accomplish one or more of the above-mentioned needs.

SUMMARY

One exemplary embodiment relates to a method of using a hand-held power tool having a debris removal attachment. The method includes providing a hand-held power tool having an output shaft and selectively coupling an extension shaft to the output shaft. The method also includes coupling a first impeller to the extension shaft and providing a housing adjacent the first impeller. The method further includes rotating the first impeller to generate a pressure differential sufficient to draw debris into the housing. The extension shaft has a first end and a second end, the first end configured to couple to the output shaft of the hand-held power tool, and the second end configured to couple to a tool bit.

Another exemplary embodiment relates to a method of using a hand-held power tool having a debris removal attachment. The method includes providing a hand-held power tool and providing a debris removal attachment. The hand-held power tool includes a motor disposed in a motor housing and an output shaft coupled to the motor. The debris removal attachment includes an extension shaft having a first end and a second end, the second end configured to couple to a tool bit, a first impeller coupled to the extension shaft, the rotation of which is configured to generate a pressure differential sufficient to draw debris into the debris removal system, a housing substantially disposed about the first impeller, a second impeller coupled to the extension shaft, and a substantially planar member separating the first impeller and the second impeller. The method further includes detachably coupling the first end of the extension shaft to the output shaft.

Another exemplary embodiment relates to a method of using a debris removal attachment for a hand-held power tool. The method includes providing an extension shaft, coupling a first impeller to the extension shaft, providing a housing adjacent the first impeller, providing a labyrinth seal in a pathway between an exterior of the housing and an interface of the extension shaft and the output shaft, selectively coupling the first end of the extension shaft to an output shaft, and rotating the first impeller to generate a pressure differential sufficient to draw debris into the housing. The extension shaft has a first end and a second end, the first end configured to couple to an output shaft, and the second end configured to couple to a tool bit. The labyrinth seal has a plurality of spaced apart annular projections provided for disrupting the pathway.

DETAILED DESCRIPTION OF EXEMPLARY EMBODIMENTS

Referring generally to the FIGURES, an exemplary embodiment of a power tool, shown as a rotary cutting tool 100, is provided. Nonexclusive examples of rotary cutting tools are shown and described in U.S. Pat. Nos. 6,443,676, 6,048,260; 5,902,080; D439,484; and D439,122 and U.S. Pat. No. 6,443,675, each of which are expressly incorporated herein by reference and which are assigned to an affiliated company of Robert Bosch Tool Corporation. It should be noted that while the rotary cutout tool shown and described herein and in the patents and applications incorporated by reference are manufactured and sold by Robert Bosch Tool Corporation, tools of other makes and models may also be used in conjunction with the inventions described herein.

An exemplary embodiment relates to a debris removal attachment for use with a hand-held power tool. The attachment includes an extension shaft, a first impeller coupled to the extension shaft, and a housing provided adjacent the first impeller. The rotation of the first impeller is configured to generate a pressure differential sufficient to draw debris into the housing.

Another exemplary embodiment relates to a hand-held power tool for cutting a workpiece. The hand-held power tool includes a motor housing having a motor provided therein, an output shaft coupled to the motor, and a debris removal system. The debris removal system includes an extension shaft detachably coupled to the output shaft, a first impeller coupled to the extension shaft, and a housing substantially disposed about the first impeller. The rotation of the first impeller is configured to generate a pressure differential sufficient to draw debris into the debris removal system.

Figure 1:
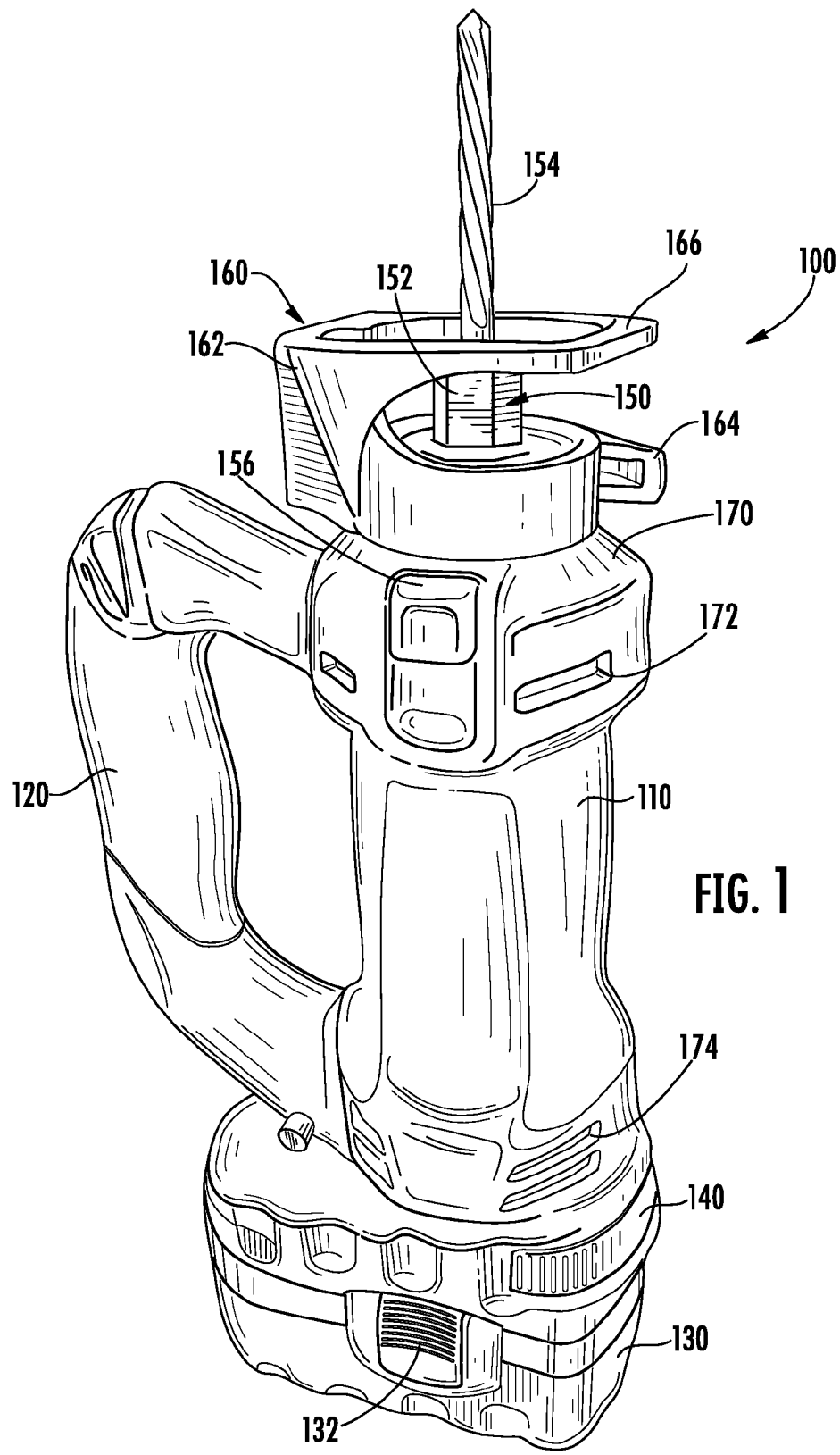
FIG. 1 is a perspective view of a hand-held power tool according to an exemplary embodiment.
Figure 2:
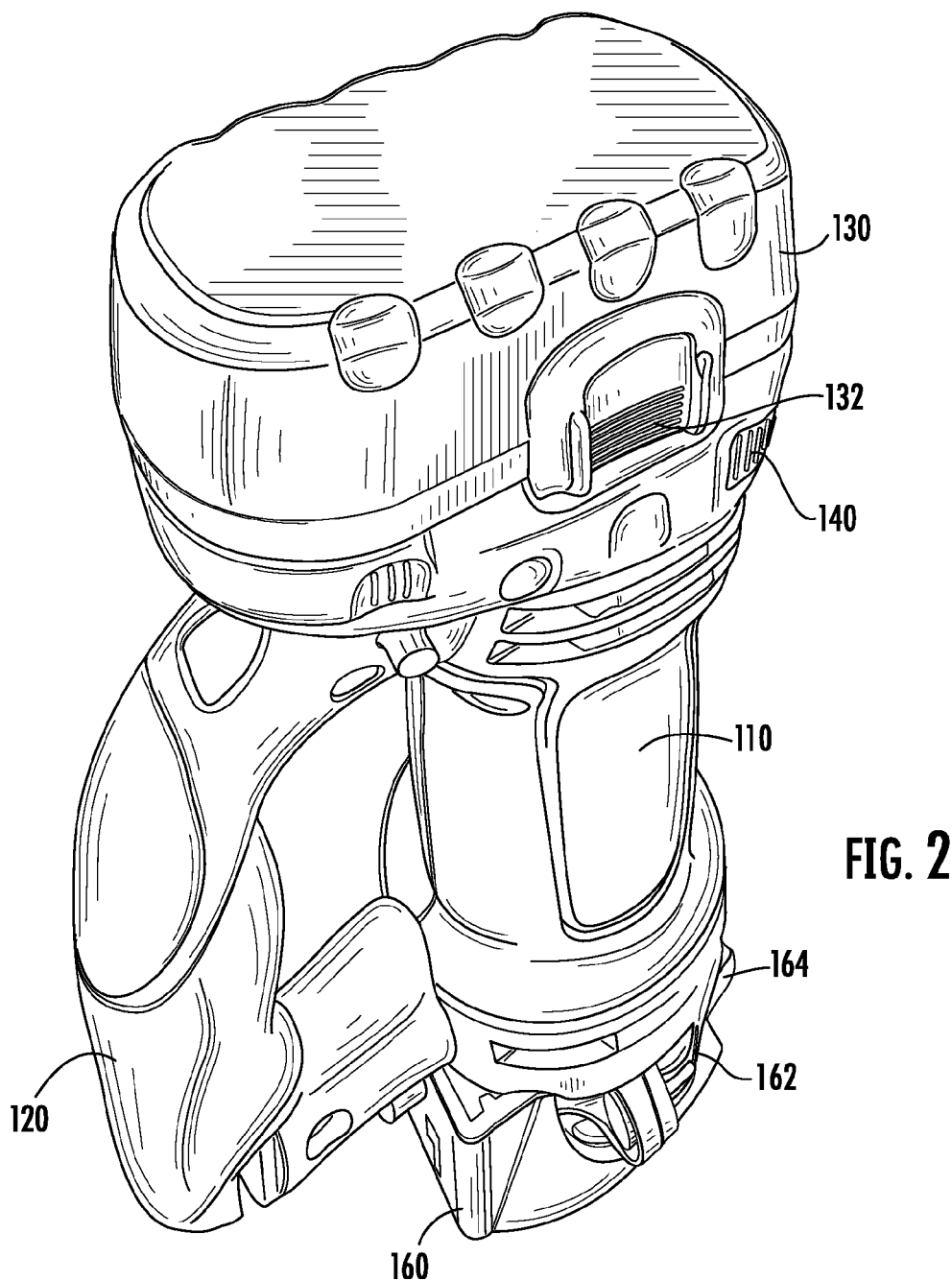
FIG. 2 is another perspective view of the hand-held power tool shown in FIG. 1.

Referring to FIG. 1, the rotary cutting tool 100 generally includes a casing or housing 110, a motor (not shown), an output shaft (not shown) coupled to the motor and configured for rotational movement, and a device or mechanism 150 for securing a tool bit 154 to the output shaft. According to the embodiment illustrated, the mechanism 150 for securing the tool bit 154 to the output shaft of the motor is a collet (not shown) having a collet nut 152. The housing 110 is made of an electrically insulating material, such as hard plastic and may be formed as two or more sections (e.g., first and second clamshell halves, etc.) which are joined together to form the housing 110 in a suitable manner, such as using mechanical fasteners, an adhesive, welding, or a combination thereof.

According to the embodiment illustrated, the housing 110 is generally cylindrical in shape, and is sized so that a typical user may support the rotary cutting tool 100 by grasping the housing 110. Optionally, the rotary cutting tool 100 may include one or more handles 120 coupled to the housing 110 to allow for the rotary cutting tool 100 to be grasped more firmly and comfortably by a user, to provide greater control of the rotary cutting tool 100 during operation, and/or to provide for more accurate cuts with less operator fatigue. Handle 120 is shown as being aligned substantially parallel with the longitudinal axis of the housing 110, but alternatively may be supported in any of a number of positions.

For some applications it may be desirable that the handle 120 be detached. For example, for making cuts in close quarters or obstructed areas, the handle 120 may become an obstruction, and actually interfere with the making of accurate cuts. Thus, it is desirable to provide both for securely attaching the handle 120 to the rotary cutting tool 100 when needed and for easily detaching the handle 120 from the rotary cutting tool 100 when its use would interfere with operation of the tool. According to the various alternative embodiments, the handle 120 (if provided) may be permanently coupled to the housing 110 (e.g., by being integrally formed with the housing 110, etc.).

According to the embodiment illustrated, the motor is enclosed within the housing 110. The motor receives electrical power from a battery pack 130 detachably supported by the housing 110. In this manner, the rotary cutting tool is a "cordless" power tool. A member or element 132 is provided to allow the battery pack 130 to be removed when the member 132 is depressed. According to an exemplary embodiment, the battery pack 130 includes one or more rechargeable batteries and has a fully charged voltage between 12 and 24 volts. The battery pack 130 may include any suitable type of batteries, such as nickel-metal hydride or lithium-ion batteries. According to various alternative embodiments, the tool 100 may be a "corded" or hard-wired power tool wherein the motor receives electrical power through an electrical cord coupled to an energy supply. According to other various alternative embodiments, the tool may be configured to be interchangeable between a cordless and a corded power tool.

Preferably, the rotary cutting tool 100 has an on/off switch for selectively energizing the motor. According to the embodiment illustrated, the motor is turned on and off by a power on/off switch 140. For example, the switch 140 is pulled away from the housing 110 to activate the motor and moved towards the housing 110 to deactivate the motor. According to other exemplary embodiments, the switch 140 may be otherwise configured. The motor may be configured to operate at a single speed (e.g., a speed between approximately 15,000 and 30,000 rpm) or a number of speeds (e.g., speeds of 15,000 rpm, 20,000 rpm, and 30,000 rpm). In a case where the motor is capable of operating at multiple speeds, the switch 140 may include multiple positions corresponding to the desired motor speed.

When energized, the motor of the rotary cutting tool 100 drives an output shaft (e.g., motor shaft, drive shaft, etc.). The output shaft of the tool 100 is generally coaxial with a central axis of the housing 110. A cooling fan (not shown), located within the housing 110 around the location where the motor shaft emerges from the housing 110 (i.e., an operating end 170), is preferably attached to the output shaft. As the output shaft is driven by the motor, the cooling fan is rotated to draw air through the housing 110 and across the motor. For this purpose, intake air vents 172 and exhaust air vents 174 are provided in the housing 110. According to the embodiment illustrated, intake air vents 172 are formed on the side of the housing 110 at the operating end 170 of the housing 110 and opposite the exhaust air vents 174. Relatively cool air is drawn by the cooling fan into the housing 110 through the air intake vents 172 to cool the motor, with relatively warm air exhausted from the housing 110 through the exhaust air vents 174.

An end of the motor shaft extends from one end of the housing 110 along the central axis thereof. A device or mechanism 150 is provided for securing a cutting accessory (e.g., a helical cutting tool bit or other accessory) to the motor shaft. The mechanism 150 includes a collet (not shown) and the collet nut 152 for securing a tool bit 154 to the motor shaft of the rotary cutting tool 100. According to an exemplary embodiment, the tool bit 154 includes a cutting edge wrapped around the axis of the bit in a helix or spiral. This cutting edge is designed such that the tool bit 154, when rotated at high speed, will cut through a workpiece in a direction perpendicular to the axis of the bit.

To secure the tool bit 154 to the output shaft, a shank of the tool bit is inserted into a central aperture of the collet, after which the collet nut 152 is tightened. A shaft lock 156 is used to prevent rotation of the output shaft when the collet nut 152 is being loosened and tightened. As the collet nut 152 is tightened down on the threaded end of the output shaft, the collet is compressed within the collet nut 152 between a partially closed end of the collet nut 152 and the output shaft. The collet is slotted and has tapered ends such that when the collet is compressed between the collet nut 152 and the output shaft, the collet is compressed radially, causing the central aperture of the collet to close tightly around the shank of the tool bit. To remove the tool bit from the output shaft, the collet nut 152 is loosened until the tool bit can be removed easily from the central aperture of the collet.

To set the depth of cut to be made by the rotary cutting tool 100, an adjustable depth guide assembly 160 may be provided. The depth guide 160 is attached to the housing 110 at the operating end 170. As shown in FIG. 1, a depth guide bracket 162 is selectively attachable to the housing 110, and may be attached to the housing 110 in any suitable manner. For example, the depth guide bracket 162 may be formed to have a split collar structure and a cam closing mechanism 164 (e.g., an over-center latch). The depth guide bracket 162 may be operated to close the collar tight around the end of the housing 110, and which may be operated to loosen the collar to remove the depth guide bracket 162 from the housing 110.

The depth of cut of the rotary cutting tool 100 may be set by moving an extending portion 166 of the depth guide 160 in an axial direction relative to the bracket 162. A locking mechanism may then be used to lock the extending portion 166 in a fixed position relative to the bracket 162 to securely fix the depth guide 160 in place. The locking mechanism may be implemented as a cam lever, as a threaded nut or a screw, or as any other suitable type of device or mechanism.

As a workpiece is cut using the rotary cutting tool 100, cutting debris (e.g., particles, dust, sawdust, chips, etc.) may deposit and build up on the workpiece surface at or near the point of the cut and/or may become airborne and disperse throughout the working environment. Such debris may interfere with the visibility of the user trying to control the rotary cutting tool 100 to make a precise cut of a desired shape. For example, debris deposited on the workpiece may obscure a cut line marked on the workpiece. Simply dispersing (e.g., blowing, etc.) such debris throughout the working environment would only increase the amount of cleanup required after the cutting is completed. To collect or otherwise contain at least a portion of the cutting debris generated by the rotary cutting tool 100, a vacuum system is added to the tool.

Figure 3:
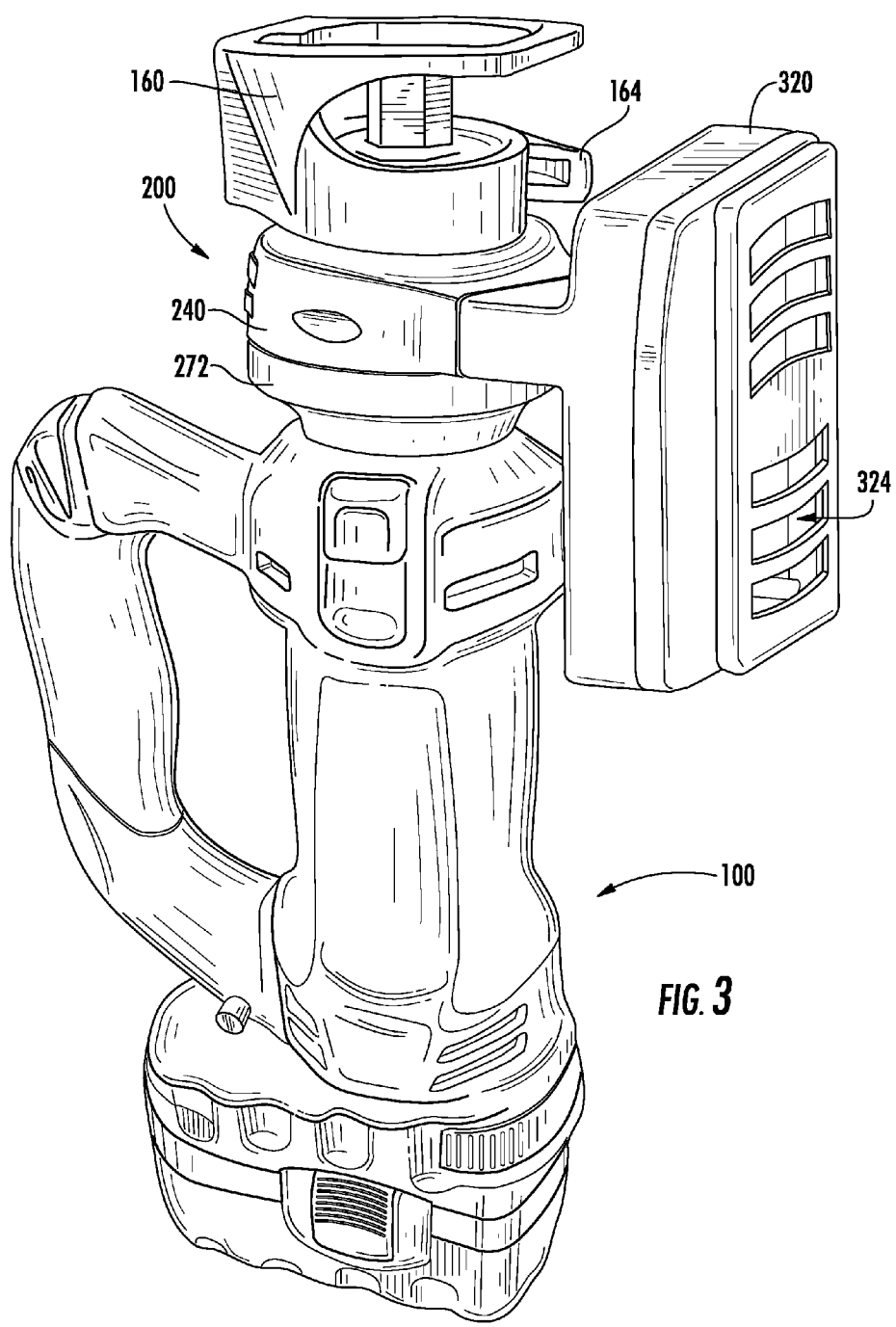
FIG. 3 is a perspective view of a debris removal system according to an exemplary embodiment shown coupled to the hand-held power tool shown in FIGS. 1 and 2.

Referring to FIG. 3, an exemplary embodiment of the vacuum system, referred to as a debris removal system 200, and components thereof is shown coupled to the rotary cutting tool 100. The debris removal system 200 generally includes a pressure differential generating element configured to draw debris away from a workpiece, a drive element for operatively coupling the pressure differential generating element to the power tool, a cover disposed at least partially about the pressure differential generating element for assisting in maintaining the pressure differential created by the pressure differential generating element, a coupling element for securing the debris removal system 200 to the power tool, and a sealing element for reducing the amount debris drawn into a housing of the power tool. Optionally, the debris removal system 200 may further include a debris collection element suitable for collecting debris drawn by the pressure differential generating element.

The debris removal system 200 is shown in the form of an attachment (e.g., an adapter, module, add-on feature, optional component, etc.) that may be securely coupled to the rotary cutting tool 100 in a relatively simple and efficient manner by a user, and removed from the rotary cutting tool 100 in a similar manner when its use is no longer desired. Further, the debris removal system 200 is preferably driven (i.e., powered) by an already existing output shaft of the rotary cutting tool 100. The pressure differential generating element of the debris removal system 200 is self-supporting (meaning that an external or standalone vacuum supply is not required to generate the pressure differential used to draw debris from the workpiece). However, in certain applications, it may be desirable to make use of an external or standalone vacuum supply.

It should be understood that, although the debris removal system 200 will be described in detail herein with reference to the rotary cutting tool 100, the debris removal system 200 may be applied to, and find utility in, other types of power tools (e.g., hand-held power tools, etc.) as well. For example, the debris removal system 200 may be suitable for use with routers, drills, reciprocating saws, grinders, jigsaws, sanders, or any other power tool. It should further be understood that while the debris removal system 200 will be described in detail herein as being a detachable system (i.e., an attachment), according to various other exemplary embodiments, the debris removal system 200 may be integrally formed with or otherwise configured to be permanently coupled to a power tool.

The debris removal system 200 is configured to remove (and optionally collect) cutting debris generated adjacent to the workpiece during the operation of the rotary cutting tool 100. The debris removal system 200 removes debris by generating an area of lower pressure (i.e., a vacuum) adjacent to the workpiece thereby causing air and at least a portion of the debris to be drawn away from the workpiece. While the debris removal system 200 is shown as an attachment (e.g., adapter, module, add-on feature, etc.) intended to be selectively added and detached from the rotary cutting tool 100, those skilled in the art who review this disclosure will readily appreciate that the debris removal system 200 may be integrated with the rotary cutting tool 100 in a manner such that the debris removal system 200 will be permanently coupled to the rotary cutting tool 100.

Figure 4:
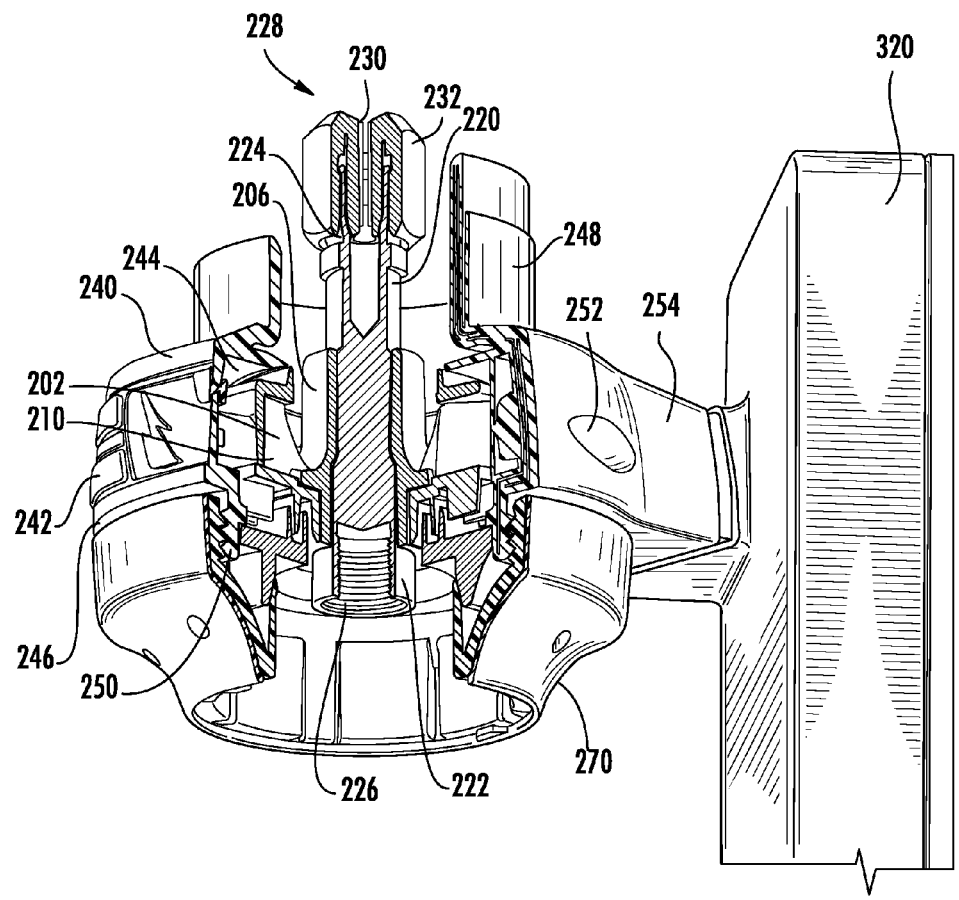
FIG. 4 is a partial cutaway perspective view of the debris removal system shown in FIG. 3.
Figure 5:
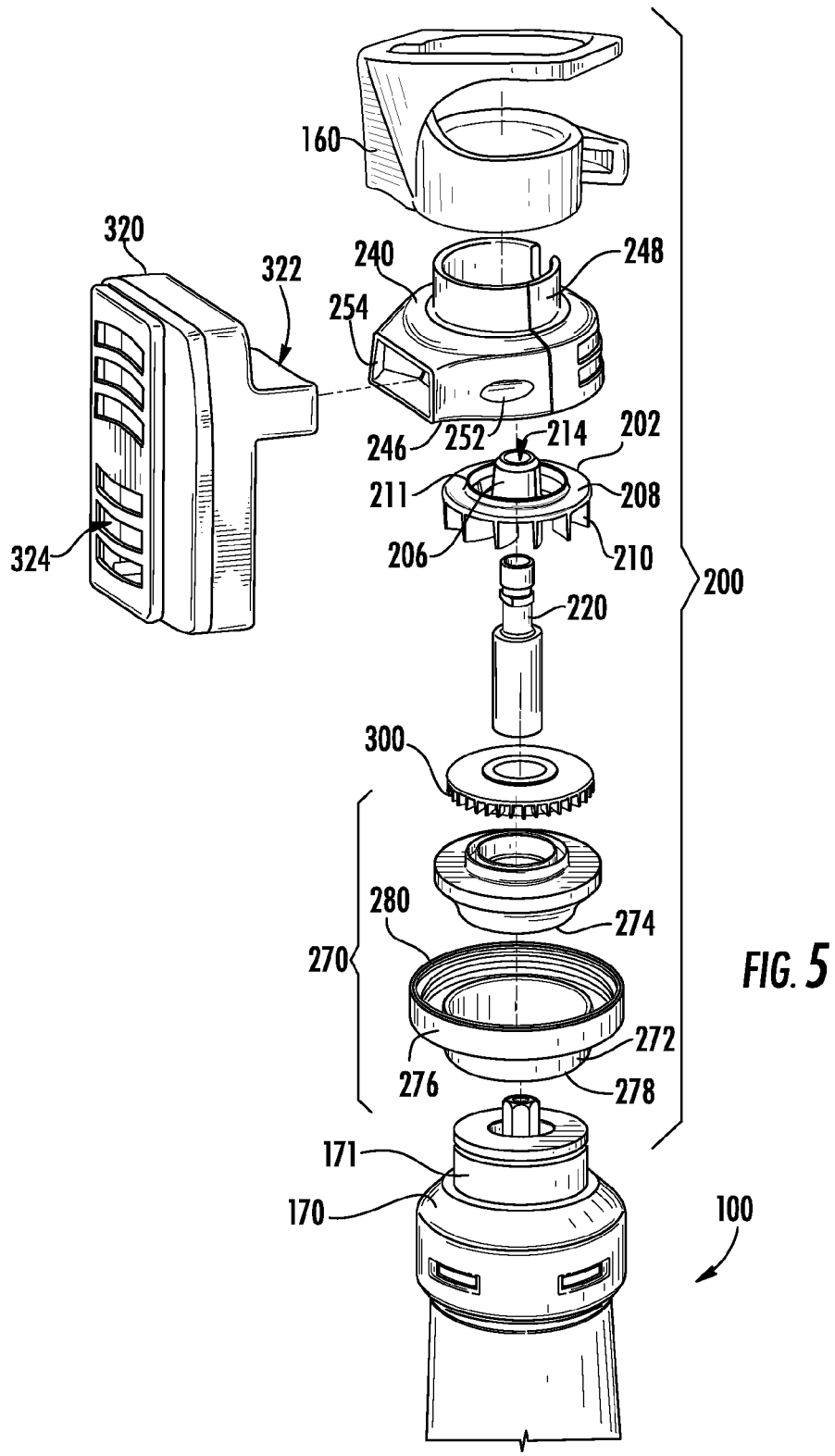
FIG. 5 is an exploded partial view of the hand-held power tool and debris removal system shown in FIG. 3.

Referring to FIGS. 4 and 5, the debris removal system 200 generally includes a pressure differential generating element (shown as a fan assembly 202), a drive element (shown as an output shaft extension 220) adapted to transfer rotational movement of the output shaft of the power tool to the pressure differential generating element, a cover element (shown as a housing 240) disposed at least partially about the pressure differential generating element, a coupling element (shown as a mounting assembly 270) for securing the debris removal system 200 to the rotary power tool 100, a sealing element (shown as a sealing system 300) adapted to reduce the amount debris drawn into the motor housing of the rotary cutting tool 100, and a debris collection element (shown as a debris receptacle or canister 320) suitable for collecting at least some of the debris removed by the pressure differential generating element.

Figure 6:
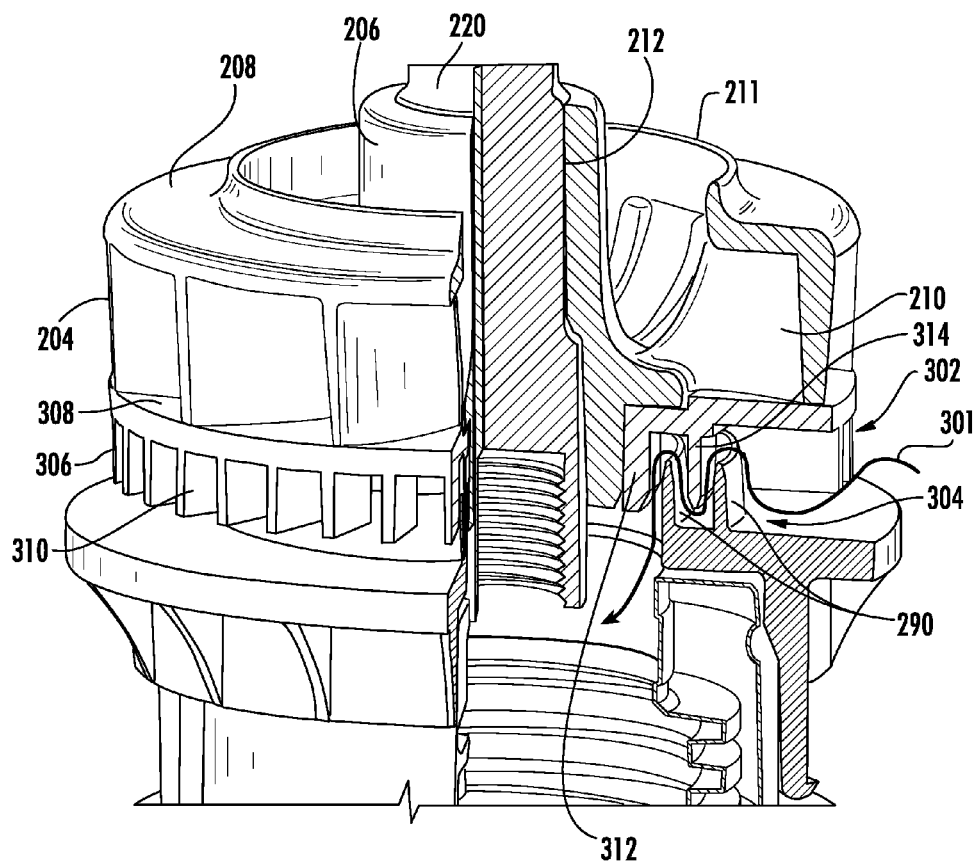
FIG. 6 is a partial cutaway perspective view of a portion of the debris removal system shown in FIG. 3.
Figure 7:
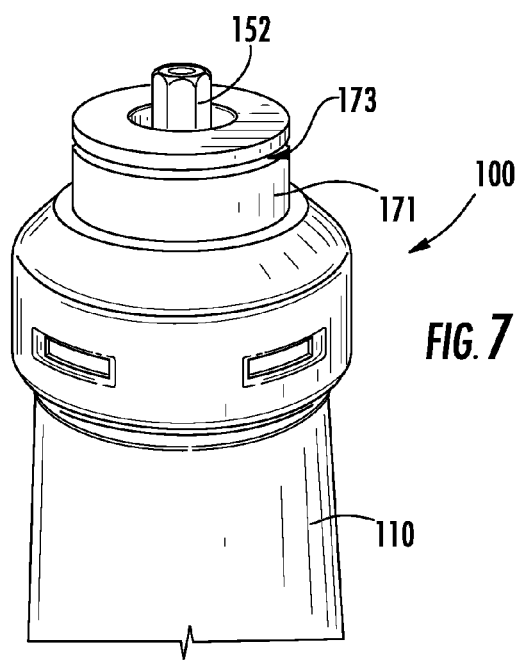
FIG. 7 is a partial perspective view of the hand-held power tool shown in FIGS. 1 and 2 without a depth guide.
Figure 8:
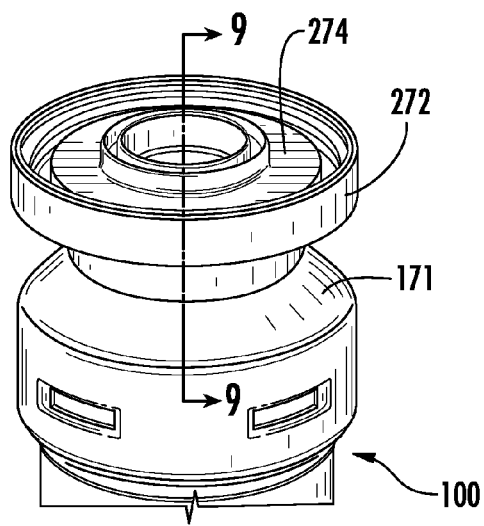
FIG. 8 is a perspective view of the portion of the hand-held power tool shown in FIG. 7 with a mounting assembly system of the debris removal system according to an exemplary embodiment.

Referring to FIG. 6, the fan assembly 202 is shown as generally comprising a first impeller 204, an annular hub 206, and a substantially planar portion 208. Rotation of first impeller 204 functions as a pump creating an area of lower pressure adjacent to the workpiece. This negative pressure differential created by rotation of the first impeller 204 causes air to be drawn from around the workpiece into the housing 240 (e.g., as shown in FIG. 5). At least a portion of the debris is carried away by the air that is drawn by the first impeller 204 thereby facilitating its removal from the workpiece and/or the rotary cutting tool 100.

The first impeller 204 is shown as having a plurality of fan blades 210 extending outwardly in a radial direction from the annular hub 206 and in the axial direction from the substantially planar portion 208. The fan blades 210 have a radius that is shown as changing from a relatively larger radius near the annular hub 206 to a relatively smaller radius near the substantially planar portion 208. The fan blades 210 are further shown as bending or curving as they extend outwardly in a radial direction from the annular hub 206. The configuration of the fan blades 210 is intended to assist in drawing air from around the workpiece into the housing 240. The fan blades 210 may be generally perpendicular to the substantially planar portion 208, or alternatively, the fan blades 210 may be tilted and provided at an angle relative to the substantially planar portion 208. According to various other exemplary embodiments, the fan blades 210 may have any of a number of configurations suitable for drawing air from around the workpiece.

The annular hub 206 is shown in the form of a sleeve having an inner surface 212 defining a bore 214 (e.g., as shown in FIG. 5). The bore 214 has a diameter sufficiently sized to be disposed about the output shaft extension 220 and facilitate in coupling the fan assembly 202 to the output shaft extension 220. Thus, the fan assembly 202 is generally concentrically aligned with the central longitudinal axis of the rotary cutting tool 100. Coupling the fan assembly 202 to the output shaft extension 220 enables the debris removal system 200 to be driven (i.e., powered) by the rotary cutting tool 100. More specifically, coupling the fan assembly 202 to the output shaft extension 220 allows the fan assembly 202 to rotate in response to the rotation of the output shaft extension 220 (and to that of the output shaft). As such, the output shaft extension 220 and the fan assembly 202 will operate at substantially the same speed. As mentioned above, the output shaft of the rotary cutting tool 100 (and thus the output shaft extension 220 and the fan assembly 202) may operate at speeds up to 30,000 rpm.

The fan assembly 202 may be coupled to the output shaft extension 220 using any of a variety of suitable techniques. For example, the inner surface 212 of the hub 206 may frictionally engage (e.g., press-fit, snap-fit, axially interfering fit, etc.) the output shaft extension 220 as the output shaft extension 220 is inserted into the bore 214. Alternatively, the fan assembly 202 may be coupled to the output shaft extension 220 using one or more mechanical fasteners (e.g., set screws, locking pins, etc.), a welding process (e.g., ultrasonic welding, etc.), an adhesive, or any other suitable technique. According to a further alternative embodiment, the fan assembly 202 may be integrally formed with the output shaft extension 220 to provide a unitary one-piece member.

The substantially planar portion 208 may provide support for the fan blades 210 and/or may assist in guiding debris that is drawn into the debris removal system 200. The substantially planar portion 208 is shown as being relatively flat and extending in a substantially radial direction (relative to the output shaft extension 220), but according to the various alternative embodiments, the substantially planar portion 208 may have one or more portions that extend linearly or curvilinearly in both an axial and/or radial direction. According to the embodiment illustrated, a projection or raised lip 211 is provided about the inner periphery of the substantially planar portion 208. The raised lip 211 may provide additional rigidity to the fan assembly 202 by reducing deflection of the substantially planar portion during rotation of the first impeller 204, and/or may further assist in guiding debris that is drawn into the debris removal system 200.

Referring to FIG. 4, to transfer the rotational movement of the output shaft of the rotary cutting tool 100 to the fan assembly 202 and/or the sealing system 300, the output shaft extension 220 is provided. The output shaft extension 220 is shown as a cylindrical member extending between a first end 222 and a second end 224. The length of the output shaft extension 220 may vary depending on the other components of the debris removal system 200. Threads 226 are provided on an inner surface of the first end 222 for coupling the output shaft extension 220 to the threaded end of the output shaft of the rotary cutting tool 100. For such an embodiment, the collet nut 152 is removed from the threaded end of the output shaft and replaced with the output shaft extension 220. According to various alternative embodiments, the first end 222 may have a structure other than the threads 226 which cooperate with a corresponding structure on the output shaft of the rotary cutting tool 100 for securing the motor shaft extension 220 to the output shaft of the rotary cutting tool 100. According to a further alternative embodiment, the first end 222 may have a structure configured to be coupled to the collet nut 152.

The second end 224 of the output shaft extension 220 is configured to receive a device or mechanism 228 capable of securing a cutting accessory to the output shaft extension 220. According to the embodiment illustrated, the mechanism 228 includes a collet 230 and a collet nut 232. The collet nut 232 may be the same collet nut 152 shown in FIG. 1, or alternatively, may be particularly adapted to couple to the second end 224 of the output shaft extension 220.

To assist in maintaining the pressure differential generated by the rotation of the fan assembly 202 and/or to assist in defining the flow path or passage for debris drawn away from the workpiece, the housing 240 is provided (e.g., as shown in FIG. 4). The housing 240 includes a cylindrical portion 242 defining a cavity or chamber 244 configured to receive the fan assembly 202. The housing 240 extends between a first end 246 and a second end 248 and is preferably coaxially aligned with the central axis of the rotary cutting tool 100. Threads 250 are provided on an indented outer surface of the first end 246. The threads 250 are provided to detachably secure the housing 240 to the mounting system 270. According to various other exemplary embodiments, the housing 240 may be coupled to the mounting system 270 using any of a variety of suitable techniques. For example, cylindrical portion 242 may include an inner detent or a raised ring to allow it to be snap-fit to a corresponding structure on the mounting system 270. According to a further alternative embodiment, the housing 240 may be coupled directly to the housing 110 of the rotary cutting tool 100.

The second end 248 of the housing 240 includes an indented cylindrical portion providing a surface to which a tool accessory may be coupled. For example, the second end 248 may be configured to receive a depth guide (e.g., the depth guide 160 shown in FIG. 5, the depth guide 1600 shown in FIGS. 14-15, etc.). According to various alternative embodiments, the second end 248 may include a structure (e.g. threads, a groove, a rib, etc.) for assisting in coupling a tool accessory to the housing 240.

The housing 240 may be made of any of a variety of suitable materials, such as hard plastic similar to that used for the housing 110 of the rotary cutting tool 100. The housing 240 may be formed of such a material in two or more complementary members (e.g., first and second clamshells halves, etc.) by a suitable molding process. The two or more members are then joined together to form the complete housing 240. The two or more members may be coupled together in any suitable technique, for example, using a welding process or an adhesive. The two or more members are preferably coupled together, using screws or another type of mechanical fastener. For this purpose, screw holes 252 may be formed in the housing 240. According to various alternative embodiments, the housing 240 may be formed as a one-piece member.

Referring further to FIG. 4, the chamber 244 defined by the housing 240 is sufficiently sized to receive the fan assembly 202 so that the first impeller 204 of the fan assembly 202 can rotate in a generally unobstructed manner therein. While the first impeller 204 requires a certain amount of clearance between the cylindrical portion 242 and the fan blades 210, according to the embodiment illustrated, any space or gap between the fan blades 210 and the cylindrical portion 242 is minimized to assist in maintaining the pressure differential generated by the fan assembly 202, and/or to reduce the overall size of the debris removal system 200. By way of example, a gap ranging between approximately 1 millimeter and approximately 2.5 millimeters may be provided between the first impeller 204 and the cylindrical portion 242. According to various other exemplary embodiments, a portion of the first impeller 204 may be configured to engage (e.g., brush against, etc.) the cylindrical portion 242 as the first impeller 204 rotates. For example, a bearing surface may be provided between the first impeller 204 and the cylindrical portion 242.

The chamber 244 is in fluid communication with at least one exhaust port or conduit (shown as an exhaust duct 254). The exhaust duct 254 provides an opening through which debris may exit the housing 240 after being drawn by the rotation of the fan assembly 202. According to the embodiment illustrated, a single exhaust duct 254 is provided. The exhaust duct 254 is preferably sized large enough to prevent or minimize the exhaust duct 254 from becoming clogged with debris.

The debris removal system 200 is shown as including the canister 320 which is configured to collect debris drawn by the fan assembly 202 and passed through the exhaust duct 254. The canister 320, shown as being supported at an open end of the exhaust duct 254, may be detachably or fixedly coupled at the exhaust duct 254. The canister 320 may be coupled at the exhaust duct 254 by a friction fit, interference fit, mechanical fastener (e.g., clip, screw, rivet, etc.), adhesive, welding or any other known or otherwise suitable technique. Detachably coupling the canister 320 at the exhaust duct 254 may allow the entire canister 320 to be selectively removed from the debris removal system 200 and/or the rotary cutting tool 100. Being able to selectively remove the canister 320 may allow a user to more easily empty debris collected in the canister 320 and/or may provide a user with a tool having increased flexibility. For example, if a user is operating a power tool in a limited space, it may be desirable to use the debris removal system 200 without the canister 320.

Preferably, the canister 320 will have sufficient capacity to collect debris generated during several cutting operations. Referring again to FIG. 5, the canister 320 is shown as being in the form of a relatively rigid housing having an inlet 322 configured to be in communication with the exhaust duct 254 and one or more exhaust vents 324 for allowing air to pass through the system. Preferably, a filter (e.g., a pad, bag, screen, etc.) is provided within the canister 320 to trap debris while allowing air to pass through the exhaust vents 324. Those skilled in the art will appreciate that the canister 320 may be replaced with any suitable mechanism for collecting debris (e.g., a fine mesh bag, etc.). Further, the debris collection element may be substantially near the rotary cutting tool 100 (as shown), or alternatively, may be provided at a distance from the tool and coupled thereto via a suitable conduit (e.g., hose, tube, pipe, etc.). According to a further alternative embodiment, an external or stand-alone vacuum (not shown) may be coupled to the exhaust duct 254 for collecting debris and/or to assist in the removal of the cutting debris from the workpiece and/or the rotary cutting tool 100.

Optionally, a seal (not shown) may be employed to seal the interface or joint between the canister 320 and the exhaust duct 254 of the housing 240. According to an exemplary embodiment, the seal may be a gasket formed of a resilient material, such as rubber, and designed to be compressed between the canister 320 and the exhaust duct 254. According to various alternative embodiments, the seal may be provided by any known or otherwise suitable technique for providing a seal. Providing a seal between the exhaust duct 254 and the canister 320 may reduce the likelihood that an opening (e.g., a gap, etc.) will exist between the exhaust duct 254 and the canister 320. Such an opening, if present, may cause an undesired change of pressure within the system (e.g., a hose of the vacuum, etc.) and/or provide an unintended escape path for debris.

According to an alternative embodiment, the debris removal system 200 may be configured without a debris collection element. For example, for certain power tools and/or certain applications a user may not be concerned about airborne debris and may only be interested in removing debris from around the workpiece. For such an embodiment, the exhaust duct 254 may be provided at an angle for directing debris away from the user and/or the rotary cutting tool 100.

Referring to FIGS. 5-9, the debris removal system 200 is coupled to the rotary cutting tool 100 by the mounting assembly 270. Preferably, the mounting assembly 270 is configured to detachably couple the debris removal system 200 to the rotary cutting tool 100 so that a user can selectively add or remove the debris removal system 200 depending on the particular application. The mounting system 270 is shown as including a first member or a mounting ring 272 and second member or a compression ring 274. The mounting ring 272 and the compression ring 274 cooperate to facilitate the securement of the debris removal system 200 to the operating end 170 of the rotary cutting tool 100.

The mounting ring 272 includes a cylindrical portion 276 extending between a first end 278 configured to be coupled to the operating end 170 of the rotating cutting tool 100 (e.g., a tool neck 171, etc.) and a second end 280 configured to be coupled to the housing 240 of the debris removal system 200. The first end 278 defines an aperture having a diameter corresponding to the diameter of the tool neck 171. According to various alternative embodiments, the first end 278 of the mounting ring 272 may have other configurations than that shown to match the particular power tool for which the debris removal system is to be used with. According to further alternative embodiments, the first end 278 of the mounting ring 272 may include an adjustable member (e.g., a clamp, etc.) for allowing the debris removal system 200 to be used with power tools differing in size and/or shape.

Figure 9:
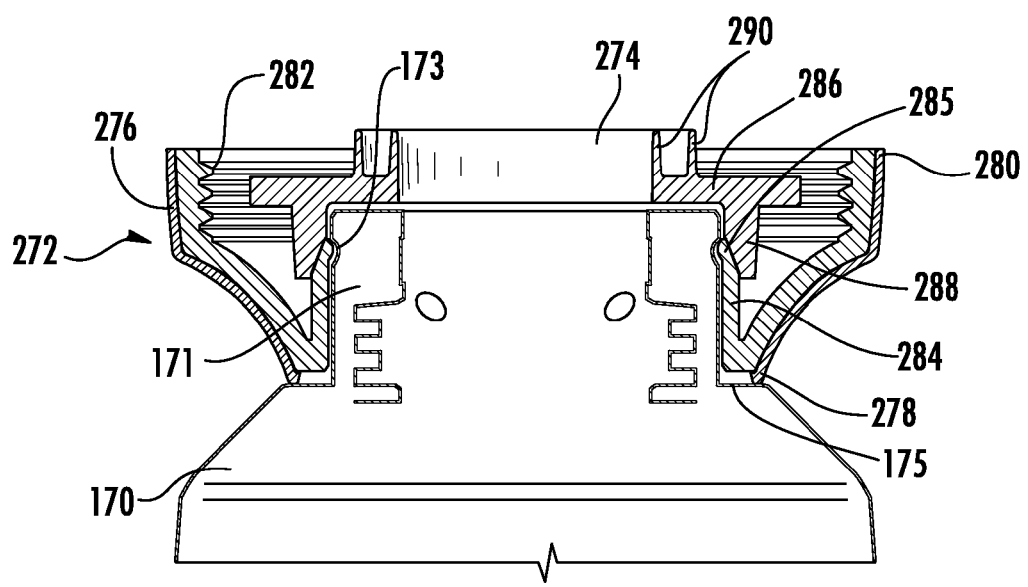
FIG. 9 is a cross-sectional view of the mounting assembly system taken along line 9-9 of FIG. 8.
Figure 10:
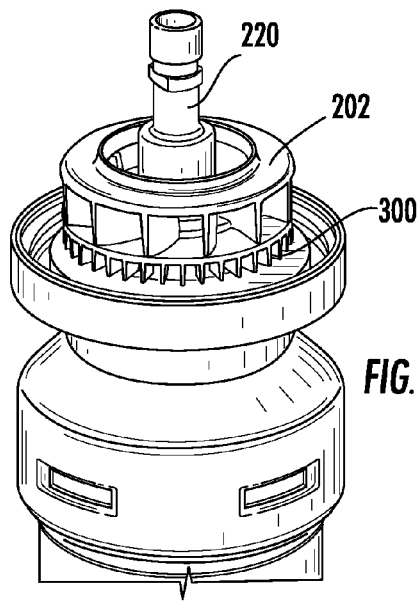
FIG. 10 is a perspective view of the portion of the hand-held power tool shown in FIG. 8 with a pressure differential generating element of the debris removal system according to an exemplary embodiment.
Figure 11:
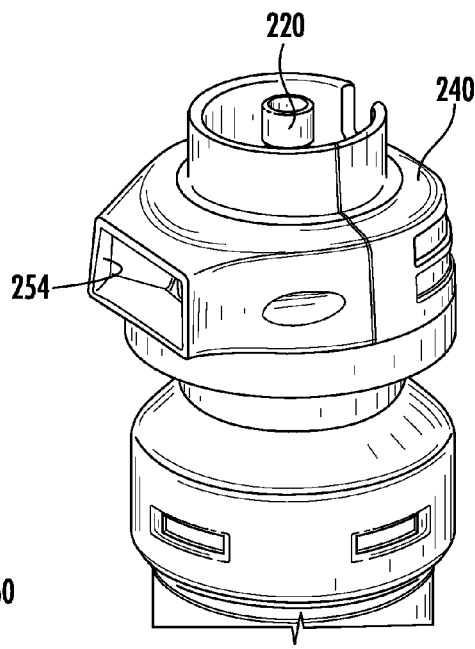
FIG. 11 is a perspective view of the portion of the hand-held power tool shown in FIG. 10 with a housing of the debris removal system according to an exemplary embodiment.
Figure 12:
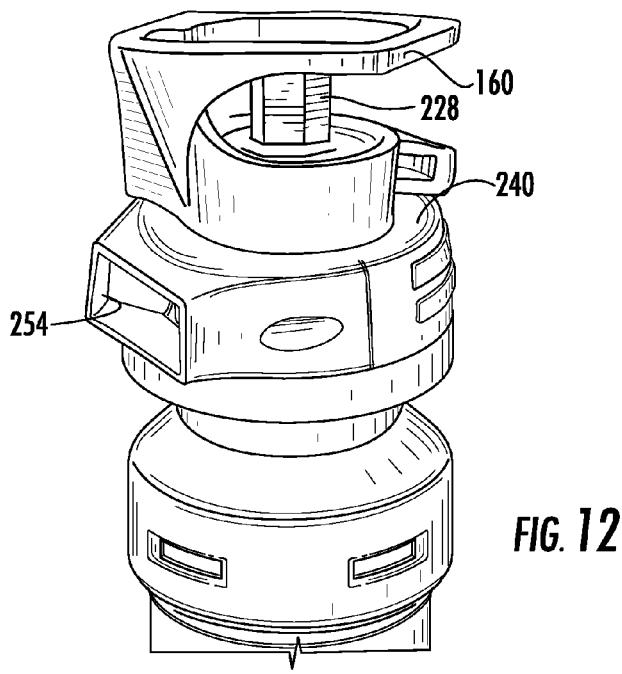
FIG. 12 is a perspective view of the portion of the hand-held power tool shown in FIG. 11 with a depth guide according to an exemplary embodiment.

Referring to FIG. 9, the first end 278 is shown as including an upwardly extending annular projection 284 configured to snap over the tool neck 171. A lip or rib 285 is provided adjacent an end of the projection 284 for engaging a corresponding structure (shown as a groove 173) on the tool neck 171. Engagement of the rib 285 into the groove 173 assists in securing the mounting ring 272 to the tool neck 171. Preferably, the projection 284 is a resilient member configured to flex when a radial force is exerted thereto.

The first end 278 of the mounting ring 272 is also shown as forming a seal with the tool neck 171. In particular, the seal is provided between a shoulder portion 175 of the tool neck 171 and an end surface of the first end 278. The shoulder portion 175 of the tool neck 171 is shown as being a substantially radial surface (relative to the output shaft), but alternatively may be an angled or sloped surface. According to an exemplary embodiment, the end surface of the first end 278 is formed of a resilient material configured to form a compression seal when the rib 285 engages the groove 173. The resilient member may be integrally molded with the mounting ring 272, or alternatively may be provided as a separate component that is attached to the mounting ring 272 and/or the tool neck 171.

According to an exemplary embodiment, threads 282 are provided on an inner surface of the second end 280 of the mounting ring 272 for detachably coupling the mounting assembly 270 to the threads 250 of the housing 240 (e.g., as shown in FIG. 4). According to various alternative embodiments, the second end 280 may include any of a number of mechanisms for coupling the mounting assembly 270 to the housing 240.

The mounting assembly 270 further includes the compression ring 274. The compression ring 274 is an annular member having a substantially planar portion 286, a first annular projection 288 extending outwardly from a first surface of the substantially planar portion 286, and one or more annular sealing projections 290 (shown as a pair of sealing projections 290) extending outwardly from a second surface of the substantially planar portion 286. The compression ring 274 is concentrically aligned with the mounting ring 272 with the first annular projection 288 being disposed outside of the projection 284 of the mounting ring 272 (i.e., provided on a side opposite the tool neck 171). A first or free end of the first annular projection 288 is shown as having an inclined surface configured to engage a corresponding surface on the projection 284. When the housing 240 is threaded onto the mounting ring 272, the housing 240 will exert a force on the compression ring 274 which will in turn cause the compression ring 274 to exert a force on the projection 284 thereby urging the rib 285 into the groove 173.

According to various other exemplary embodiments, any number of suitable mounting assemblies may be employed to couple the housing 240 to the rotary cutting tool 100. For example, the mounting ring 272 and the compression ring 274 may be integrally formed as a single, one-piece unitary body. According to a further alternative embodiment, the mounting assembly may be configured to permanently couple the debris removal system 200 to the rotary cutting tool 100.

Referring now to FIG. 6, an exemplary embodiment of the sealing system 300 is shown. The sealing system 300 is provided in an effort to prevent debris from being drawn into the housing 110 of the rotary cutting tool 100 and/or to reduce the amount of debris realized by a front bearing (not shown) of the rotary cutting tool 100. Reducing the amount of debris drawn into the housing 110 may prolong the operating life of the rotary cutting tool 100 by reducing the amount of build-up that may occur on the motor from debris entering the housing 110. Similarly, reducing the amount of debris reaching the front bearing may allow the output shaft to continue to rotate at a consistent speed. The sealing system 300 provides a seal between the output shaft of the rotary cutting tool 100 and the debris removal system 200. To accommodate the dynamic nature of the sealing location between the output shaft and the debris removal system 200 (e.g., the output shaft of the rotary cutting tool 100 can operate in excess of 30,000 rpm), the sealing system 300 is preferably in the form of a non-contact seal (i.e., a seal that does not physically contact the rotating output shaft).

According to the embodiment illustrated, the sealing system 300 comprises a first seal 302 and a second seal 304. The first seal 302 is configured to generate an air stream or flow for pushing or deflecting at least a portion of the debris away from the tool 100, while the second seal 304 is configured to deter debris from reaching the front bearing and/or the housing 110 by providing a labyrinth seal comprising at least one barrier for restricting (e.g., selectively altering, etc.) a passage leading to the interface or joint between the output shaft and the output shaft extension 220. According to various other exemplary embodiments, the debris removal system 200 may include only one seal (e.g., the first seal 302 or the second seal 304, etc.), or may include any number of seals greater than two.

The first seal 302 (e.g., a deflection seal, etc.) is shown as a fan assembly generally comprising a second impeller 306 and a substantially planar portion 308. The second impeller 306 is shown as having a plurality of fan blades 310 outwardly extending in a radial direction from an annular hub 312 and in axial direction from the substantially planar portion 308. The fan blades 310 are shown as being generally perpendicular to the substantially planar portion 308. The substantially planar portion 308 divides the first impeller 204 from the second impeller 306 and may assist in preventing debris drawn into the housing 240 from reaching the operating end 170 of the rotary cutting tool 100.

The second seal 304 provides additional sealing protection by functioning as a back-up seal for debris getting past the first seal 302. The second seal 304 is in the form of a labyrinth seal having one or more barriers (e.g., projections, etc.). According to the embodiment illustrated, the second seal 304 comprises one or more annular projections 314 (e.g. barriers, etc.) extending from the second impeller 306 which cooperate with the sealing projections 290 extending from the compression ring 274 to form the labyrinth seal. As shown, the annular projection 314 is concentrically aligned between the sealing projections 290. When assembled, a gap is provided between a free end of the annular projection 314 and the substantially planar portion 286 of the compression ring 274. Similarly, gaps are provided between free ends of the sealing projections 290 and the substantially planar portion 308 of the second impeller 306. The size of such gaps are minimized. These gaps define a passage (such as, e.g., represented by arrow 301 in FIG. 6) through which debris would have to follow in order to reach the operating end 170 of the rotary cutting tool 100. According to various other exemplary embodiments, the second seal 304 may include any number of barriers, aligned at any of a variety of orientations, for restricting the passage leading to the joint between the output shaft and the output shaft extension 220.

It should be noted that, the first impeller 204 may be integrally formed with the second impeller 306 or may be provided as a separate component. According to the embodiment illustrated, the first impeller 204 and the second impeller 306 are separate components configured to be coupled together in a manner such that the rotation of the first impeller 204 coincides with the rotation of the second impeller 306.

In some applications, a user may wish to detach the debris removal system 200 from the rotary cutting tool 100. For example, when making cuts in close quarters or obstructed areas, the added length and/or width of the debris removal system 200 may become an obstruction, and actually interfere with the making of accurate cuts. Further, when repeatedly making overhead cuts, the added weight of the debris removal system 200 may be undesirable to a user. Thus, it is desirable to provide for both securely coupling the debris removal system 200 to the rotary cutting tool 100 and for easily detaching the debris removal system 200 from the rotary cutting tool 100.

With reference to FIGS. 7 through 12, the following methods may be employed to add or remove the debris removal system 200 relative to the rotary cutting tool 100. To add the debris removal system 200 to the rotary cutting tool 100, a depth guide (if being employed) is selectively removed from the operating end 170 of the rotary cutting tool 100, and the collet nut 152 is removed from the output shaft. The mounting ring 272 of the mounting assembly 270 can then be disposed over (e.g. snapped over, etc.) the operating end 170 such that the rib 285 of the projection 284 extending from the mounting ring 272 is substantially aligned with and engages the groove 173 formed in the tool neck 171. The compression ring 274 can then be disposed about the tool neck 171 such that the first annular projection 288 is provided on the outside of the projection 284 of the mounting ring 272. Alternatively, the mounting ring 272 and the compression ring 274 may be coupled together and installed on the rotary cutting tool as a single unit.

The output shaft extension 220 may then be coupled to the output shaft by rotating the output shaft extension 220 about the threads of the output shaft. The second impeller 306 and the first impeller 204 can then be disposed about the output shaft extension 220. Alternatively, the second impeller 306, the first impeller 204, and the output shaft extension 220 may be coupled together and installed on the rotary cutting tool 100 as a single unit.

The housing 240 may then be threaded into the mounting ring 272. As the housing 240 is threaded into the mounting ring 272, the compression ring 274 forces the mounting ring 272 into engagement with the tool neck 171. At this point, the mechanism 228 may be coupled to the second end 224 of the output shaft extension 220, and/or the depth guide 160 may be added. To remove the debris removal system 200, the above-described steps may be reversed.

Figure 13:
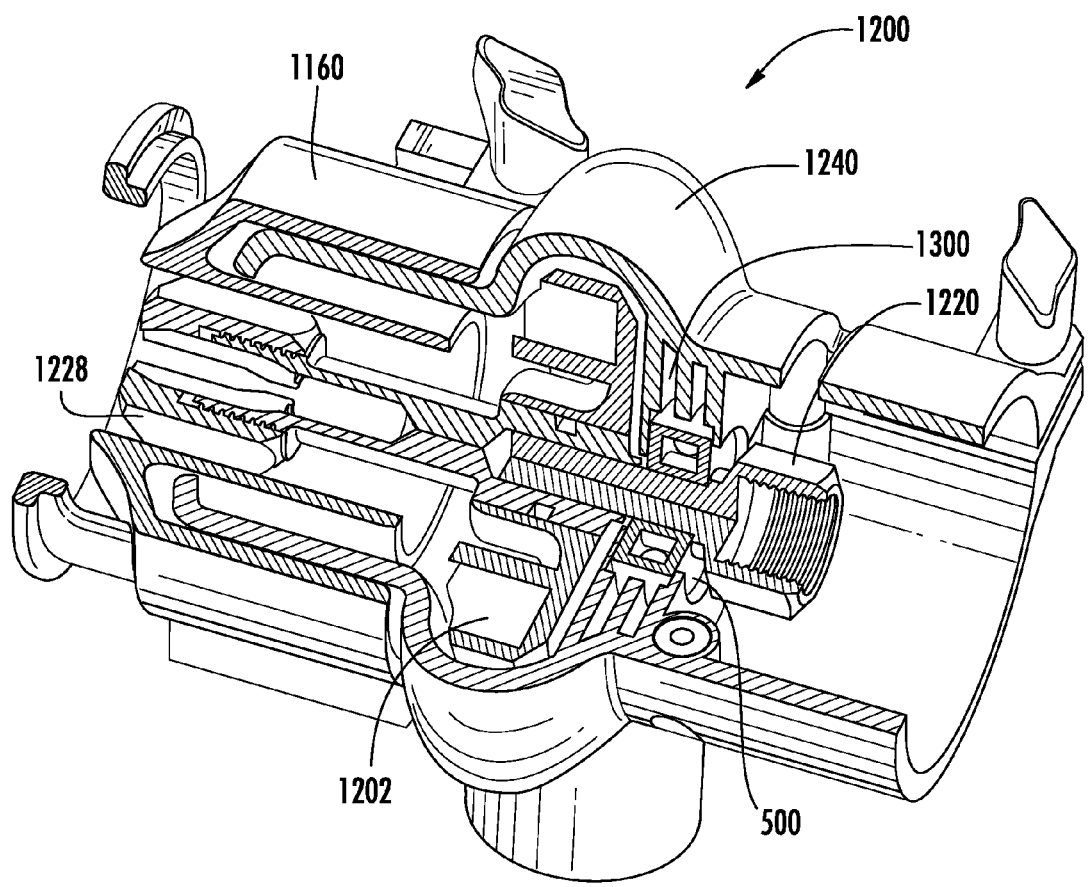
FIG. 13 is a partial cutaway perspective view of a debris removal system according to another exemplary embodiment.

Referring to FIG. 13, another exemplary embodiment of a debris removal system 1200 is shown. For brevity, the description of the debris removal system 1200 will be generally limited to its differences relative to the debris removal system 200 described above. For convenience, elements of the debris removal system 1200 that are substantially similar to corresponding elements of the debris removal system 200 will be identified by the same reference numerals but preceded by a "1."

The debris removal system 1200 differs from the debris removal system 200 in that the sealing system 1300 does not make use of the second impeller 306. Without the second impeller 306, the sealing system 1300 does not employ a deflection seal or a labyrinth seal. Rather, the sealing system 1300 comprises a bearing 500 disposed about the output shaft extension 1220. The bearing 500 is shown as being disposed about the output shaft extension 1220 near the interface with the output shaft. According to other embodiments, the bearing 500 may be disposed about the output shaft extension 1220 in a different location.

As indicated earlier, it may be desirable to provide an attachment that a user may use to set the depth of the cut to be made by the rotary cutting tool 100 (i.e., a depth guide). However, it has been discovered that in certain applications use of a depth guide in combination with the debris removal system 200 reduces the pressure differential (i.e., suction) generated by the debris removal system 200 around the workpiece thereby reducing the effectiveness and/or efficiency of the debris removal system 200. The reduction of suction is caused at least in part by the general openness of the depth guide. For example, the depth guide 160 illustrated in FIG. 1 intentionally includes a generally open structure so that visibility by a user around the operating head of the power tool is increased.

Figure 14:
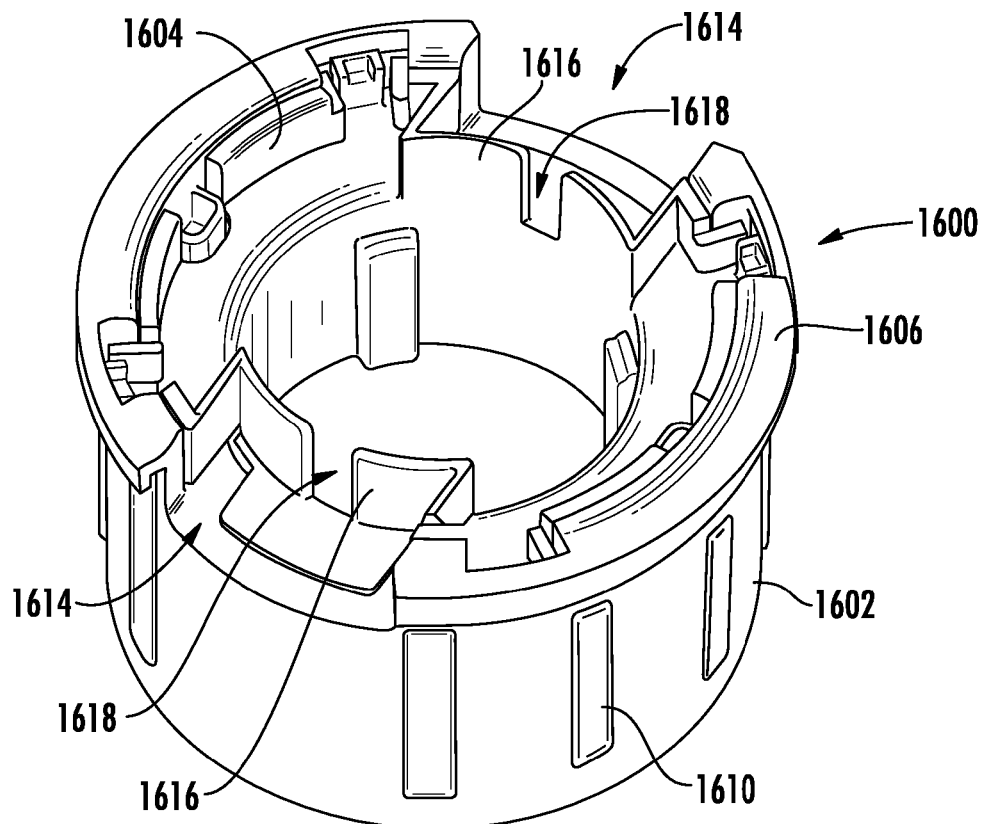
FIG. 14 is a bottom perspective view of a depth guide attachment according to an exemplary embodiment.
Figure 15:
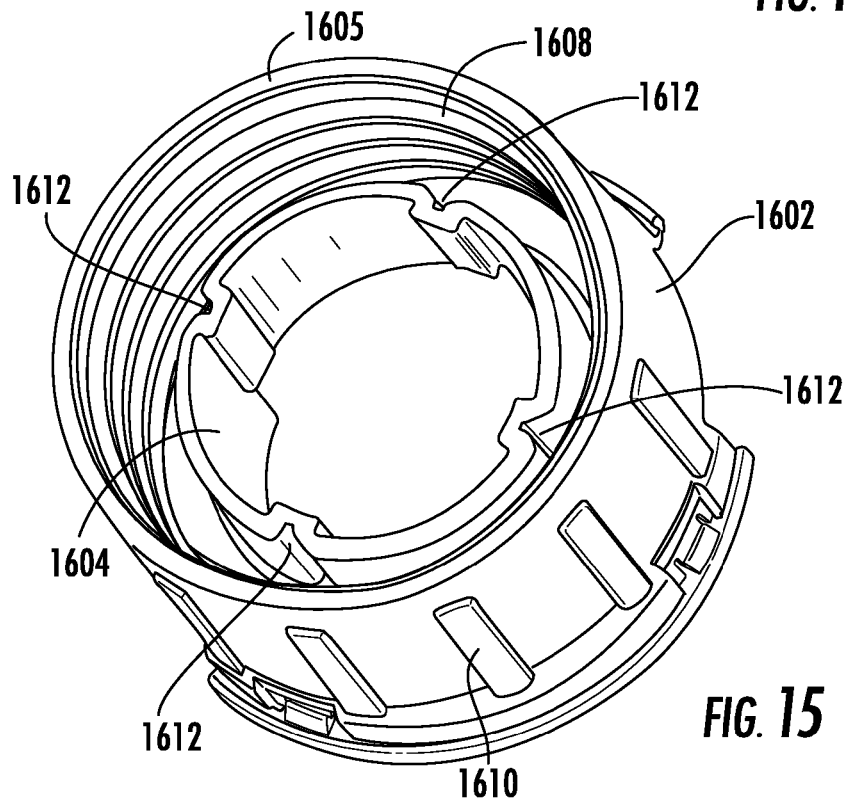
FIG. 15 is a top perspective view of the depth guide attachment shown in FIG. 14.

With reference to FIGS. 14 and 15, another exemplary embodiment of a depth guide suitable for use with a power tool utilizing a vacuum or debris removal system, such as the debris removal system 200, is provided. The depth guide, shown as depth guide 1600, is capable of maintaining a pressure differential created by the debris removal system 200 so that cutting debris can be effectively removed from around the tool bit when a depth guide is being used. According to an exemplary embodiment, the depth guide 1600 is selectively attachable to the debris removal system 200 and/or the housing 110 of the rotary cutting tool 100.

It should be noted that while the depth guide 1600 is described as being coupled to the debris removal system 200, the depth guide 1600 may also be coupled directly to the rotary cutting tool 100 in the event that a debris removal system is not used.

The depth guide 1600 generally includes an outer portion (e.g., body, etc.), shown as a base 1602 and an inner portion, shown as an insert 1604. The insert 1604 is shown as being a separate member that is coupled relative to the base 1602, but alternatively the base 1602 and the insert 1604 may be provided as an integrally formed one-piece unitary body. The base 1602 and the insert 1604 cooperate to define a substantially enclosed passage or chamber between the workpiece and the debris removal system 200.

The base 1602 is shown as a generally cylindrical member having a top end 1605 (shown in FIG. 15) and a bottom end 1606 (shown in FIG. 14). When the depth guide 1600 is coupled to the debris removal system 200, the top end 1605 is configured to be adjacent to the debris removal system 200, while the bottom end 1606 is configured to be placed adjacent to the workpiece during a cutting operation performed by the rotary cutting tool.

According to the embodiment illustrated, threads 1608 are provided on an inner surface of the base 1602 for coupling the depth guide 1600 to the outside of the debris removal system 200. For such an embodiment, complementary threads are disposed on an outer surface of the debris removal system 200 (e.g., at second end 248 of housing 240, etc.) to engage the threads 1608. For example, complementary threads may be disposed on an outer surface of the second end 248 of the housing 240 (shown in FIG. 5). The threads 1608 preferably begin at the top end 1605 of the base 1602 and extend downward a substantial length of the base 1602.

With the engagement of the threads 1608 and the corresponding threads on the debris removal system 200, the depth of the cut of the rotary cutting tool 100 may be set by rotating the base 1602 relative to the debris removal system 200. Depending on the direction of rotation, rotation of the base 1602 will cause the base 1602 to move upward or downward in an axial direction relative to the debris removal system 200 thereby setting the depth of cut. For such an embodiment, the accuracy of the depth guide 1600 is dictated, at least in part, by the size of the threads 1608. For example, a user is likely to have more control over the positioning of the depth guide 1600 in the axial direction if the thread size of the threads 1608 is a relatively fine thread rather than a relatively course thread.

To assist a user in rotating the base 1602, an outer surface of the base 1602 includes a configuration intended to promote gripping of the base 1602 either by a hand of the user or by a suitable tool (e.g., wrench, clamp, etc.). According to an exemplary embodiment, the outer surface of the base 1602 includes one or more raised projections intended to simplify the rotation of the base 1602. According to the embodiment illustrated, the base 1602 includes a series of spaced-apart projections 1610 extending in a substantially axial direction around the periphery of the outer surface of the base 1602. The projections 1610 are shown as being substantially rectangular in shape, but alternatively may be provided in any of a variety of suitable shapes (e.g., spherical, etc.).

Attachment of the depth guide 1600 to the debris removal system 200 is not limited to a threaded connection. According to various alternative embodiments, the depth guide 1600 may be attached to the debris removal system 200 in any suitable manner. For example, the base 1602 of the depth guide 1600 may be formed to have a split collar structure and a cam closing mechanism (e.g., an over-center latch) which is operated to close the collar tight around the end of the debris removal system 200, and which may be operated to loosen the collar to remove the depth guide 1600 from the debris removal system 200.

Referring to FIG. 14 in particular, the bottom end 1606 of the base 1602 includes one or more apertures (e.g., cutouts, notches, windows, etc.), shown as openings 1614. The openings 1614 allow air to enter when a negative pressure differential is created by the debris removal system 200 and provide visibility around the rotary cutting tool 100 for a user. According to an exemplary embodiment, the openings 1614 are sized large enough to provide sufficient visibility around the rotary cutting tool 100 for the user. According to the embodiment illustrated, the base 1602 is provided with two openings 1614, spaced equidistant from each other at approximately 180 degrees.

Still referring to FIG. 14, the insert 1604 is provided, at least in part, to limit the amount of air passing through the openings 1614 in the base 1602 so that the negative pressure differential created by the debris removal system 200 is substantially maintained. The insert 1604 is shown as a generally cylindrical member that is coupled to the base 1602. According to an exemplary embodiment, the insert 1604 is coupled to the base 1602 via an interference fit (e.g., snap-fit, etc.). According to various alternative embodiments, the insert 1604 may be coupled to the base 1602 using a mechanical fastener, friction fit, adhesive, welding, or any other known or suitable technique.

The insert 1604 includes a member (e.g., panel, shield, etc.), shown as deflector 1616, corresponding to each of the openings 1614. The deflectors 1616 are aligned with the openings 1614 and offset radially inward therefrom. Each deflector 1616 includes one or more apertures (e.g., cutouts, notches, windows, etc.), shown as an opening 1618. The size of the opening 1618 is smaller than the size of the opening 1614 from which the deflector 1616 is positioned behind. Utilizing the inwardly offset deflectors 1616 in combination with the openings 1614 may improve visibility around the cutting tool since the openings 1614 can be sized larger than if no deflector 1616 was provided. According to various alternative embodiments, use of the insert 1604 and/or the deflectors 1616 may be eliminated and the openings 1614 in the base 1602 may be optimized so that a user is provided with sufficient visibility without substantially diminishing the suction created by the debris removal system 200.

A locking mechanism may be used to lock the base 1602 in a fixed position relative to the debris removal system 200 to securely fix the depth guide 1600 in place. According to an exemplary embodiment, the locking mechanism is a biasing element (e.g., a spring arm, etc.) supported at the debris removal system 200 and configured to releasably engage the insert 1604 for securing the base 1602 in a fixed position.

Referring to FIG. 15, the insert 1604 is shown as including a plurality of spaced-apart indentations 1612 with openings facing the inner surface of the base 1602. According to the embodiment illustrated, the insert 1604 includes four indentations 1612, each one being spaced-apart approximately 90 degrees from an adjacent indentation 1612. The biasing element on the debris removal system 200 is configured to releasably engage one or more of the indentations 1612 to lock or otherwise secure the depth guide 1600 at every 90 degrees of rotation. Use of the biasing element, in combination with the indentations 1612, is intended to reduce the likelihood that the locking mechanism will loosen or otherwise fail due to the vibration of the rotary cutting tool 100 during operation. According to various alternative embodiments, the locking mechanism may be implemented as a cam lever, as a threaded nut or a screw, or as any other suitable type of device or mechanism.

The debris removal systems 200 and 1200 detailed above advantageously provide debris removal systems that are not required to be connected to a standalone vacuum system. The debris removal systems 200 and 1200 also advantageously provide debris removal systems that are detachable and which may be securely coupled to a power tool in a relatively simple and efficient manner. The debris removal systems 200 and 1200 further advantageously provide debris removal systems configured to reduce the amount of debris entering the motor housing of the power tool. The debris removal systems 200 and 1200 further advantageously provide debris removal systems that are driven by an already existing output shaft of the power tool.

It is important to note that the construction and arrangement of the power tool and debris removal system as shown in the various exemplary embodiments is illustrative only.

Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, elements shown as multiple parts may be integrally formed, the position of elements may be reversed or otherwise varied, and the nature or number of discrete elements or positions may be altered or varied. Accordingly, all such modifications are intended to be included within the scope of the present invention as defined in the appended claims. The order or sequence of any process or method steps may be varied or re-sequenced according to alternative embodiments. Other substitutions, modifications, changes and omissions may be made in the design, operating conditions and arrangement of the exemplary embodiments without departing from the scope of the present inventions as expressed in the appended claims.

What is claimed is:

1. A method of using a hand-held power tool having a debris removal attachment, the method comprising:
    providing a hand-held power tool having a tool neck and an output shaft;
    providing a debris removal attachment comprising:
        an extension shaft having a first end and a second end, the first end configured to couple to the output shaft of the hand-held power tool, and the second end configured to couple to a tool bit;
        a first impeller coupled to the extension shaft; and
        a housing adjacent the first impeller;
        wherein the debris removal attachment is configured to be coupled to the tool neck;
    selectively coupling the extension shaft to the output shaft; and
    rotating the first impeller to generate a pressure differential sufficient to draw debris into the housing.

2. The method of claim 1, further comprising providing a second impeller coupled to the extension shaft, the rotation of which is configured to push debris away from an interface between the extension shaft and the hand-held power tool.

3. The method of claim 1, further comprising coupling the attachment to a tool neck of the hand-held power tool.

4. The method of claim 3, wherein coupling the attachment to a tool neck comprises slidably engaging the attachment and the tool neck of the hand-held power tool.

5. The method of claim 1, further comprising providing a labyrinth seal in a pathway between an exterior of the housing and an interface of the extension shaft and the hand-held power tool, the labyrinth seal having a plurality of spaced apart annular projections provided for disrupting the pathway.

6. The method of claim 1, further comprising sealing an interface between the extension shaft and the hand-held power tool with at least one bearing disposed about the extension shaft.

7. A method of using a hand-held power tool having a debris removal attachment, the method comprising:
    providing a hand-held power tool comprising:
        a motor disposed in a motor housing;
        an output shaft coupled to the motor; and
    providing a debris removal attachment comprising:
        an extension shaft having a first end and a second end, the second end configured to couple to a tool bit;
        a first impeller coupled to the extension shaft, the rotation of which is configured to generate a pressure differential sufficient to draw debris into the debris removal attachment;
        a housing substantially disposed about the first impeller;
        a second impeller coupled to the extension shaft; and
        a substantially planar member separating the first impeller and the second impeller; and
    detachably coupling the first end of the extension shaft to the output shaft.

8. The method of claim 7, further comprising rotating the second impeller to push debris away from an interface between the extension shaft and the hand-held power tool.

9. The method of claim 7, wherein the debris removal attachment further comprises a labyrinth seal having a plurality of spaced apart annular projections provided for disrupting a pathway between an exterior of the housing and an interface of the extension shaft and the hand-held power tool.

10. The method of claim 7, further comprising sealing an interface between the extension shaft and the hand-held power tool with at least one bearing disposed about the extension shaft.

11. The method of claim 7, further comprising coupling the attachment to a tool neck of the hand-held power tool.

12. The method of claim 11, wherein coupling the attachment to a tool neck comprises slidably engaging the attachment and the tool neck of the hand-held power tool.

13. The method of claim 7, further comprising powering the hand-held power tool with a battery.

14. The method of claim 7, wherein the housing defines an exhaust port through which debris drawn into the housing is designed to exit the housing; and
    further comprising coupling a receptacle to the exhaust port, the receptacle configured for collecting debris exiting the exhaust port.

15. The method of claim 7, further comprising selectively coupling a depth guide to the debris removal attachment.

16. A method of using a debris removal attachment for a hand-held power tool having an output shaft, the method comprising:
    providing an extension shaft, the extension shaft having a first impeller coupled to the extension shaft, a first end, and a second end, the first end configured to couple to the output shaft, and the second end configured to couple to a tool bit;
    providing a housing adjacent the first impeller;
    providing a labyrinth seal in a pathway between an exterior of the housing and an interface of the extension shaft and the output shaft, the labyrinth seal having a plurality of spaced apart annular projections provided for disrupting the pathway;
    selectively coupling the first end of the extension shaft to the output shaft such that operation of the hand-held power tool causes rotation of the extension shaft; and
    operating the hand-held power tool to cause rotation of the first impeller to generate a pressure differential sufficient to draw debris into the housing.

17. The method of claim 16, further comprising providing a second impeller coupled to the extension shaft, the rotation of which is configured to push debris away from the interface between the extension shaft and the output shaft.

18. The method of claim 17, further comprising providing a substantially planar member that separates the first impeller and the second impeller.

19. The method of claim 17, wherein the first impeller to the second impeller are permanently coupled.

20. The method of claim 19, wherein the extension shaft is permanently coupled to the first impeller and the second impeller.

* * * * *